June 15, 1965   E. ANSORG   3,189,263
PACKING SYSTEM FOR ROTARY COMBUSTION ENGINE AND THE LIKE
Filed Jan. 21, 1963   2 Sheets-Sheet 1

INVENTOR
Ernst Ansorg

INVENTOR
Ernst Ansorg

United States Patent Office 3,189,263
Patented June 15, 1965

3,189,263
PACKING SYSTEM FOR ROTARY COMBUSTION ENGINE AND THE LIKE
Ernst Ansorg, Schweinfurt (Main), Germany, assignor to Fichtel & Sachs A.G., Schweinfurt (Main), Germany, a corporation of Germany
Filed Jan. 21, 1963, Ser. No. 252,987
Claims priority, application Germany, Feb. 8, 1962, F 35,980
9 Claims. (Cl. 230—145)

This invention relates to a packing system for rotary engines, such as rotary combustion engines.

More specifically, the invention relates to that type of rotary engine which comprises a shell or stator, a rotor, and an eccentric rotor hub arranged within the shell for rotation of the rotor and the eccentric hub in opposite directions. The rotor possesses peripherally and spacedly arranged toothlike projections referred to hereinafter as "lobes." Each of the lobes is provided with a recess to accommodate with a certain freedom of motion an element of a packing system, this element being referred to in the specification and claims as a "packing member." Each of the packing members is adapted to be pressed against the inner surface of the shell to make a tight joint between the rotor and the shell. The pressure causing the tight joint is produced, for instance, by gas under pressure, entering from a working chamber into a neighboring recess in the rotor and acting upon the packing member in that recess in an outward direction.

In the packing system of known rotary engines of the referred to type, the packing member which has some free motion in its recess is of narrow rectangular cross section. The frontal face of the packing member forms a packing edge which is pressed against a trochoidal surface on a middle portion of the shell, while at the same time, and alternatingly, one of the sides of the packing member, depending on the operating cycle of the engine, is tightly pressed against a respective side wall of the recess.

The known packing systems have a great disadvantage. After some time of operation wear marks form on the trochoidal surface, which deepen gradually until they may cause breakage of a packing member and thus result in all the disadvantageous consequences associated therewith. But even with no breaks of packing members, deepening wear marks impair the sealing of working chambers and diminish the effectiveness of the engine already before a complete breakdown of the engine due to breakage may occur.

The primary object of the present invention, in its broadest aspect, is to do away with the causes for the formation of wear marks of the referred to kind and thus to prevent such formation.

It has been found that the formation of wear marks on the inner surface of the shell of known rotary engines is jointly caused by a number of phenomena. First, there occur movements of the rotor relative to the trochoidal inner shell surface, which relative movements are due to the mounting of the rotor on the eccentric hub. In the second place, there develops a frictional resistance to the relative movement of a packing member and the rotor. As the rotor is urged by gas pressure in a radial outward direction by an amount of the radial play of the mounting of the rotor on the eccentric hub, the packing member involved will, due to the referred to friction across the sides of the packing member and the recess walls, lag behind the outward movement of the rotor and fail to produce immediately a tight joint with the shell on the inner surface thereof. The gap between a packing member in its retracted position and the trochoidal surface being very small, and the speed of the flow of gas through said gap being very great, the gas pressure between the packing member and the trochoidal surface will be greatly reduced, so that, in view of this reduction, the friction between the packing member and the rotor across the walls of the recess will be overcome abruptly. The packing member will thus strike with force against the inner surface of the shell, which results in the formation of wear marks. Accordingly, it is a specific object of my invention to make sure that the packing members will not hit the shell with force.

It will readily be appreciated that when a packing member is prevented by the friction developing in the recess of the rotor from compensating at once for a radial relative movement of the shell and the rotor, and no tight joint is achieved between the packing member and the shell, gas under pressure is permitted to flow from one working chamber to a neighboring one. The invention aims at a packing system which will ensure a permanent joint between packing member and shell, notwithstanding the relative movements of the shell and the rotor, and will not permit a flow of gas under pressure in any non-desirable manner.

These and such other objects of the invention as will be apparent from the following description are achieved by providing a packing system for a rotary combustion engine or the like, which comprises a shell and a rotor mounted on an eccentric hub within the shell for rotation of the rotor and hub in opposite directions. The rotor possesses on its periphery at least a single projection or lobe which is provided with a recess to accommodate a packing member with a certain freedom of motion. The packing member is shaped to have at least two axially elongated edges which engage respective surface portions of the stator and rotor in such a manner that the packing member may rock about the edges.

The specification is accompanied by drawings in which.

Figure 1:
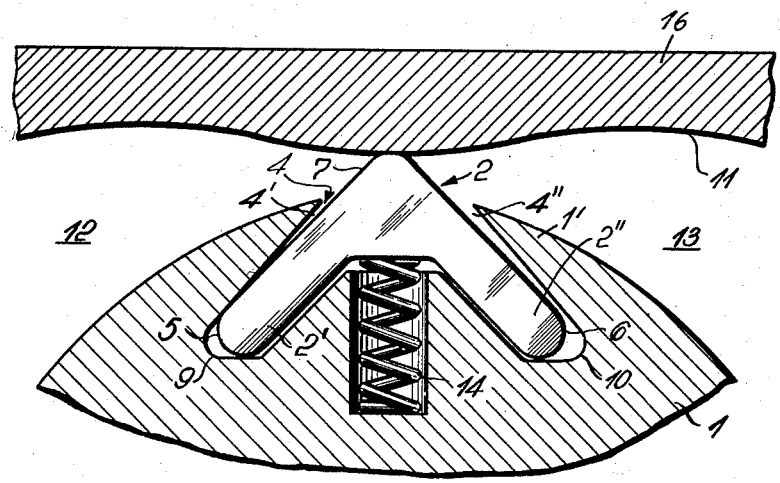
FIG. 1 is a fragmentary schematic section through a packing system according to the invention.

Referring to the drawings in greater detail now, and initially to FIG. 1, the inner surface 11 of a portion of a shell 16 of a rotary combustion engine is shown in cross section to form a double-arched epitrochoid. A rotor 1 is rotatably mounted on a rotatable eccentric hub (not shown) and possesses several toothlike projections or lobes 1', one lobe only being shown. In each of the existing lobes there is a recess 4 whose orifice extends over the whole width of the rotor 1 and is shaped to receive a packing bar 2 of L-shaped cross section with some freedom of circumferential and radial motion. The bar essentially consists of two narrow elongated plates 2', 2'' integrally connected at right angles to form a packing edge 7 which makes a tight joint with the trochoidal surface of the shell 16, and seals the working chambers 12 and 13 from each other. The two plates 2', 2'' are obliquely inclined relative to the surface 11, and are loosely received in corresponding obliquely inclined pocket portions 4', 4'' of the recess 4. The packing bar is pressed outwardly by a helical compression spring 14 accommodated in a cavity in the rotor 1. The respective free longitudinal edges 5 and 6 of the plates 2', 2'' are adapted to engage inner wall portions 9 and 10 of the recess 4 which are offset from the orifice of the recess in opposite circumferential directions. Because of the rounded shape of the edges 5, 6 and the flat shape of the engaged wall portions, there is substantially line contact between the edges and the wall portions when in sealing engagement.

Figure 2:
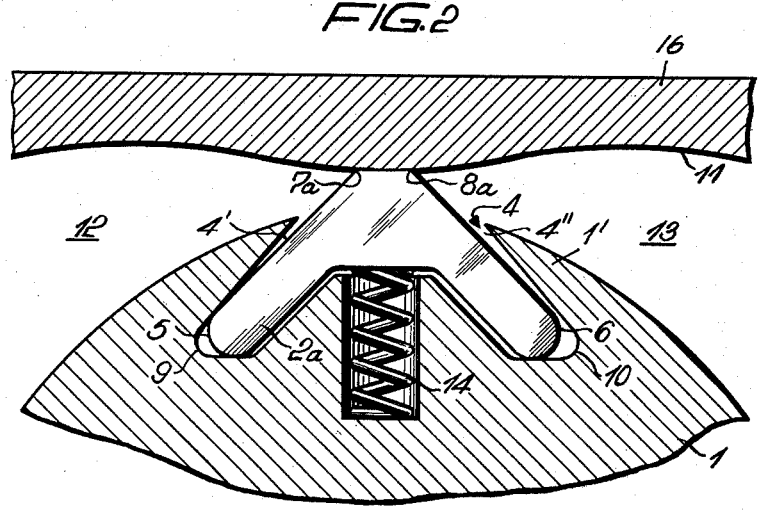
FIG. 2 is a similar view showing a modified packing system.

In the modification of FIG. 2, the rotor 1, lobes 1', the recess 4 in each of the lobes, and the shell 16 are the same as in FIG. 1. It is the packing bar 2a which differs from the packing bar 2 of FIG. 1. The packing bar 2a has again two free longitudinal edges 5 and 6, but is shown to have a relatively wide surface in contact with the shell 16 between two packing edges 7a and 8a. Thus, there are four edges adapted to make sealing contact with the surface 11 or the wall portions 9, 10.

Figure 3:
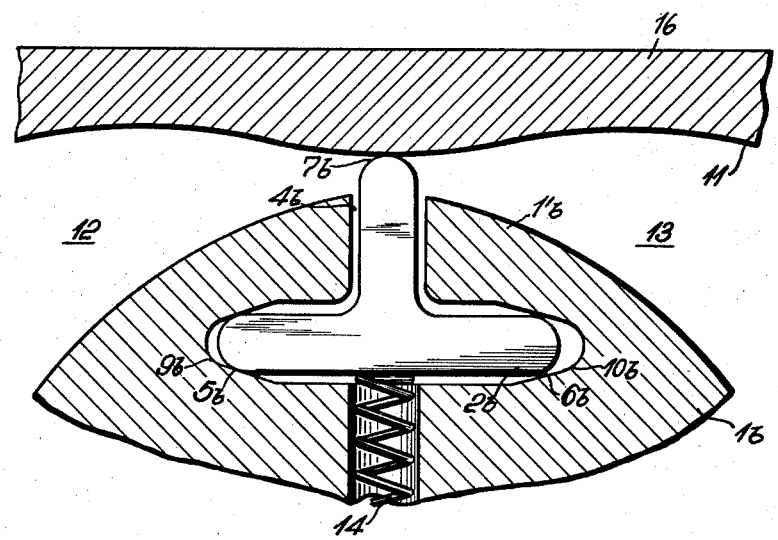
FIG. 3 shows another modification.

The packing bars 2 and 2a of FIGS. 1 and 2, respectively, are substantially of L-shaped cross section, whereas the packing bar 2b of FIG. 3 has a T-shaped cross section. The packing bar 2b which is received, again with a certain freedom of motion, in a matingly shaped recess 4b has three sealing edges altogether as has the packing bar 2 of FIG. 1, these three edges being designated 7b, 5b, and 6b. The edge 7b is in contact with the shell 16, and the edges 5b and 6b are adapted pivotally to engage inner wall portions 9b and 10b, respectively, in the recess 4b depending on the direction of rotation of the rotor 1b. The portion of the bar 2b which extends between the edges 5b and 7b is thus the functional equivalent of the plate 2', and the portion between the edges 6b and 7b corresponds to the plate 2".

Figure 4:
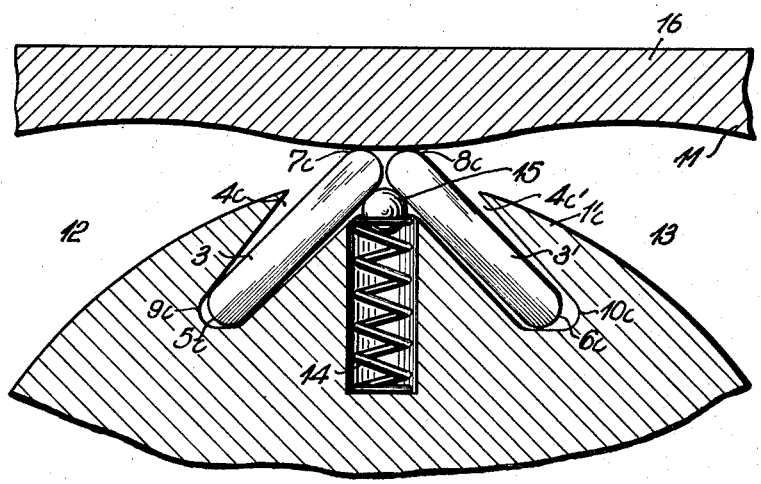
FIG. 4 shows still another modification.

In the construction of FIG. 4, there are two packing plates 3 and 3' instead of the single packing bar 2 (FIG. 1), 2a (FIG. 2), or 2b (FIG. 3). The packing plates 3, 3' are of narrow elongated shape and are arranged to resemble, when taken as a whole, the packing bar 2a of FIG. 2. They are received in respective inclined pockets 4c of a recess in the lobe 1c' and 4c' and provide four packing edges 7c, 8c, 5c, and 6c. The packing edges 7c and 8c are in contact with the shell surface 11, whereas the packing edges 5c and 6c are adapted to engage the inner wall portion 9c in the recess 4c, and the inner wall portion 10c in the recess 4c', respectively. The spring 14 is shown to act on the end portions of the packing plates 3, 3' near the shell 16 by means of an intermediary ball 15. However, the ball 15 may be omitted as well, and the spring 14 may be arranged to act immediately upon the packing plates.

The packing system of my invention functions as follows:

When the engine is started, as well as during idling, the spring 14 which acts upon a single packing bar or upon the two packing plates of FIG. 4 produces a sufficiently tight joint with the shell 16 to seal the working chambers 12 and 13 at a relatively low pressure differential between the chambers. When, under working conditions, the engine reaches a high number of revolutions, centrifugal forces develop and thrust the packing member against the trochoidal shell surface, which ensures further tightening. During combustion and the compression stroke, with prevailing high gas pressures, it is the gas pressure itself which does the tightening when there is a relatively great pressure difference between the chambers.

If, for instance, there is higher pressure in the chamber 13 (FIG. 1), compared with the pressure in the associated chamber 12, the pressure difference will make itself felt in the recess 4 and urge the packing bar 2 toward the chamber 12 until the edge 5 engages the wall portion 9, and will then make the packing bar 2 rock about the edge 5, while the packing edge 7 keeps tightly engaging the trochoidal surface on the shell 16 during operation of the engine. In the constructions of FIGS. 2 and 3, a higher pressure in the chamber 13 will have similar results, except that with the packing system of FIG. 2 two packing edges 7a and 8a are pressed against, and kept in engagement with, the shell 16. In the case of the construction of FIG. 4, a higher pressure in the chamber 13 and in the recess 4c' will urge the packing edge of the packing plate 3 against the wall portion 9c of the recess 4c and make the packing edge 7c press against the shell 16 for rocking movement about a pivot axis defined by the line of contact between the wall portion 9c and the edge 5c, and simultaneously about the line of contact between the surface 11 and the edge 7c. In each of the cases of FIGS. 1 to 4, a higher pressure in the chamber 13 will help the spring 14 ensure continuous tight sealing between the chambers 12 and 13. A higher pressure in the chamber 12 in each of the four modifications shown will reverse the conditions.

In the event of higher pressure in the chamber 13, the packing members 2, 2a, 2b, and 3 rock about a pivot formed by the rounded edge 5 (FIGS. 1 and 2), 5b (FIG. 3), or 5c (FIG. 4) and a wall portion in the respective recess, so that the packing edges 7, 7a and 8a, 7b, 7c can follow the relative motion between the packing member and the shell. The frictional resistance to this turning movement depends on the radius of curvature of the turning edge. It is in any case substantially smaller than the resistance to a relative sliding movement.

The surface of a packing member of the invention, for instance, the surface between the edges 6 and 7 (FIG. 1), upon which a pressure differential acts is larger than the corresponding surface of the packing members hitherto used, which is another factor that contributes to the great effectiveness of the present packing system.

It will be appreciated that the favorable relation between the effective gas pressure and the frictional resistance to the turning, for instance, of the packing member 2 (FIG. 1) on the wall portions 9 or 10 in the recess 4, ensures that the packing edge 7 will at any time produce a tight joint with the trochoidal surface of the shell 16. The packing edge 7, regardless of the radial movements of the rotor 1 relative to the shell 16, will always engage the trochoidal surface. No wear marks will form.

It is believed that the construction and operation of my packing system will be fully understood from the foregoing description. It is apparent that the packing system may be advantageously used, for instance, for rotary steam engines as well. The rotor of the engine may be provided with any suitable number of lobes. Inlet and exhaust ports may be provided in any suitable way. Thus, it will also be apparent that while I have shown and described my invention in a few forms only many changes and many more modifications may be made without departing from the spirit of the invention defined in the appendant claims.

I claim:
1. In a rotary engine, in combination:
(a) a shell formed with a cavity therein;
(b) a rotor movable in said cavity about an axis of rotation,
  (1) said shell and said rotor having oppositely spaced respective circumferential faces in said cavity,
  (2) said rotor being formed with an axially extending recess, said recess having an orifice in said face of the rotor and an inner portion spaced from said orifice,
  (3) said rotor having a wall portion in said inner portion of the recess, said wall portion being circumferentially offset relative to said orifice;
(c) a packing member having one axially elongated edge portion received in said inner portion and another axially elongated edge portion outwardly spaced from said orifice,
  (1) said packing member being dimensioned for circumferential movement in said orifice and in said inner portion toward and away from a position of abutting sealing engagement in which said one edge portion and said wall portion are substantially in line contact,
  (2) said one edge portion and said wall when in said position jointly constituting pivot means for movement of said packing member about a pivot axis extending in the direction of said axis of rotation,
  (3) said other edge portion of said packing member moving toward and away from a position of sealing engagement with said face of said shell when said packing member moves about said pivot axis; and (d) yieldably resilient means urging said other edge portion toward said position of sealing engagement.

2. In a rotary internal combustion engine, in combination:

(a) a shell formed with a cavity therein and having a circumferential surface in said cavity;

(b) a rotor rotatable in said cavity relative to said shell about an axis, said rotor being formed with a recess opposite said surface;

(c) a packing member partly received in said recess,
 (1) said packing member having a plurality of edge portions elongated in a common direction,
 (2) two of said edge portions being received in respective portions of said recess, said rotor having respective wall portions in said portions of said recess, said wall portions being circumferentially offset relative to said orifice in opposite directions, and
 (3) said packing member being circumferentially movable in said recess between two positions in which said two edge portions alternatively engage the associated wall portions substantially in line contact, each engaged wall portion and edge portion jointly constituting pivot means for movement of said packing member about a corresponding pivot axis,
 (4) a third edge portion of said packing member arcuately moving toward and away from said surface when said packing member moves about either of said pivot axes; and (d) yieldably resilient means urging said other edge portion to move toward said surface into sealing engagement therewith.

3. In a rotary internal combustion engine, in combination:

(a) a shell formed with a cavity therein and having a circumferential surface in said cavity;

(b) a rotor rotatable in said cavity relative to said shell about an axis, said rotor being formed with a recess having an orifice opposite a portion of said surface and an inner portion spaced from said orifice, said recess having a cross section elongated in a direction obliquely inclined relative to said surface portion, and said rotor having a wall portion in said inner portion of said recess, said wall portion being circumferentially offset from said orifice; and (c) a packing plate member partly received in said recess and dimensioned for circumferential movement in said orifice and in said inner portion,
 (1) said packing plate member having a cross section elongated in said obliquely inclined direction and having two edge portions elongated in a common direction transverse to said obliquely inclined direction,
 (2) one of said edge portions pivotally engaging said wall portion of the rotor in said recess, said portion and the engaged wall portion constituting pivot means for movement of said packing member about a pivot axis extending in said common direction,
 (3) the other edge portion of said packing member moving toward and away from said portion of said surface when said packing member moves about said pivot axis.

4. In an engine as set forth in claim 3, a spring interposed between said rotor and said packing member for urging said other edge portion to move about said pivot axis toward said surface portion into sealing engagement therewith.

5. In a rotary internal combustion engine, in combination:

(a) a shell formed with a cavity therein and having a surface in said cavity;

(b) a rotor rotatable in said cavity relative to said shell, said rotor being formed with a recess opposite a portion of said surface, said recess having two pocket portions, the respective cross sections of said pocket portions being elongated in two directions obliquely inclined relative to said surface portion and transverse to each other; and (c) a packing plate member partly received in each pocket portion and movable therein,
 (1) said packing plate members having respective cross sections elongated in said obliquely inclined directions, and having each a plurality of edge portions elongated in a common direction transverse to said obliquely inclined directions,
 (2) one edge portion of each plate member pivotally engaging said rotor in the corresponding pocket portion for movement of said packing plate member about a pivot axis extending in said common direction,
 (3) another edge portion of each plate member moving toward and away from said portion of said surface about said axis when said packing plate member moves about said pivot axis.

6. In an engine as set forth in claim 5, yieldably resilient means urging said other edge portion to move about a corresponding axis toward said surface portion into sealing engagement therewith.

7. In an engine as set forth in claim 5, said other edge portions of said plate members being fixedly fastened to each other, and yieldably resilient means urging said fixedly fastened edge portions to move about one of said axes toward said surface portion for sealing engagement therewith.

8. In an engine as set forth in claim 7, said plate members jointly constituting a bar member of approximately L-shaped cross section.

9. In an engine as set forth in claim 7, said plate members jointly constituting a bar member of approximately T-shaped cross section.

References Cited by the Examiner

UNITED STATES PATENTS

| | | | |
|---|---|---|---|
| 696,047 | 3/02 | Houseman | 91—140 |
| 1,211,169 | 1/17 | Kells | 230—154 X |
| 1,495,526 | 5/24 | Phillips | 103—136 |
| 1,560,624 | 11/25 | Varley | 103—131 |
| 1,686,569 | 10/28 | McMillan | 230—145 |
| 1,864,699 | 6/32 | Varley | 103—130 X |
| 2,466,389 | 4/49 | Davis | 123—8 |
| 2,599,927 | 6/52 | Livermore | 103—136 |
| 2,628,568 | 2/53 | Rhine | 103—136 |
| 2,830,543 | 4/58 | Roth | 103—135 |
| 2,960,076 | 11/60 | Henry | 123—8 |
| 3,033,180 | 5/62 | Bentele | 123—8 |

FOREIGN PATENTS

| | | |
|---|---|---|
| 590,085 | 3/25 | France. |
| 392,328 | 3/24 | Germany. |
| 451,416 | 10/27 | Germany. |
| 14,547 | of 1885 | Great Britain. |

KARL J. ALBRECHT, *Primary Examiner.*

JOSEPH H. BRANSON, Jr., *Examiner.*